UNITED STATES PATENT OFFICE.

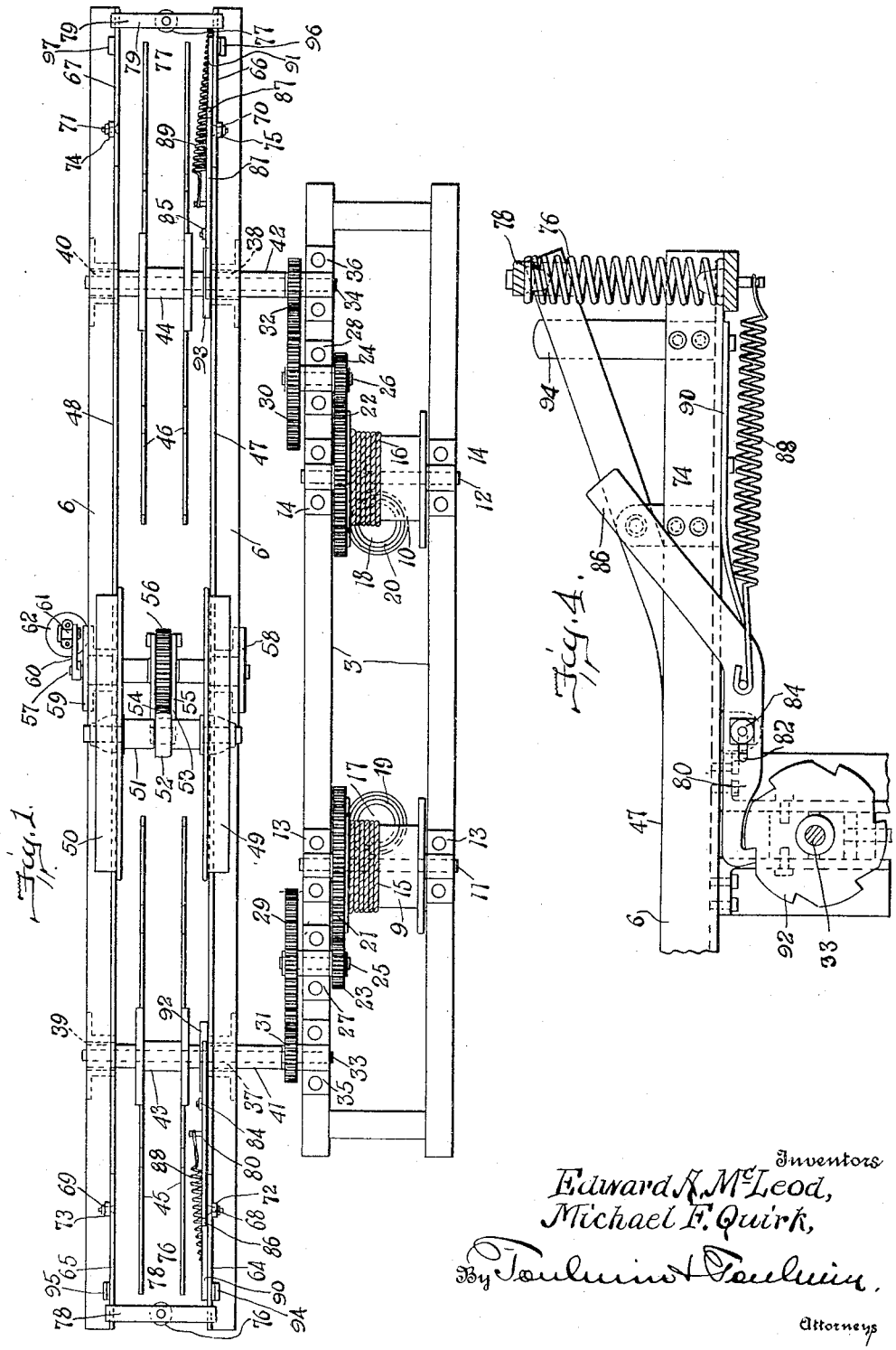

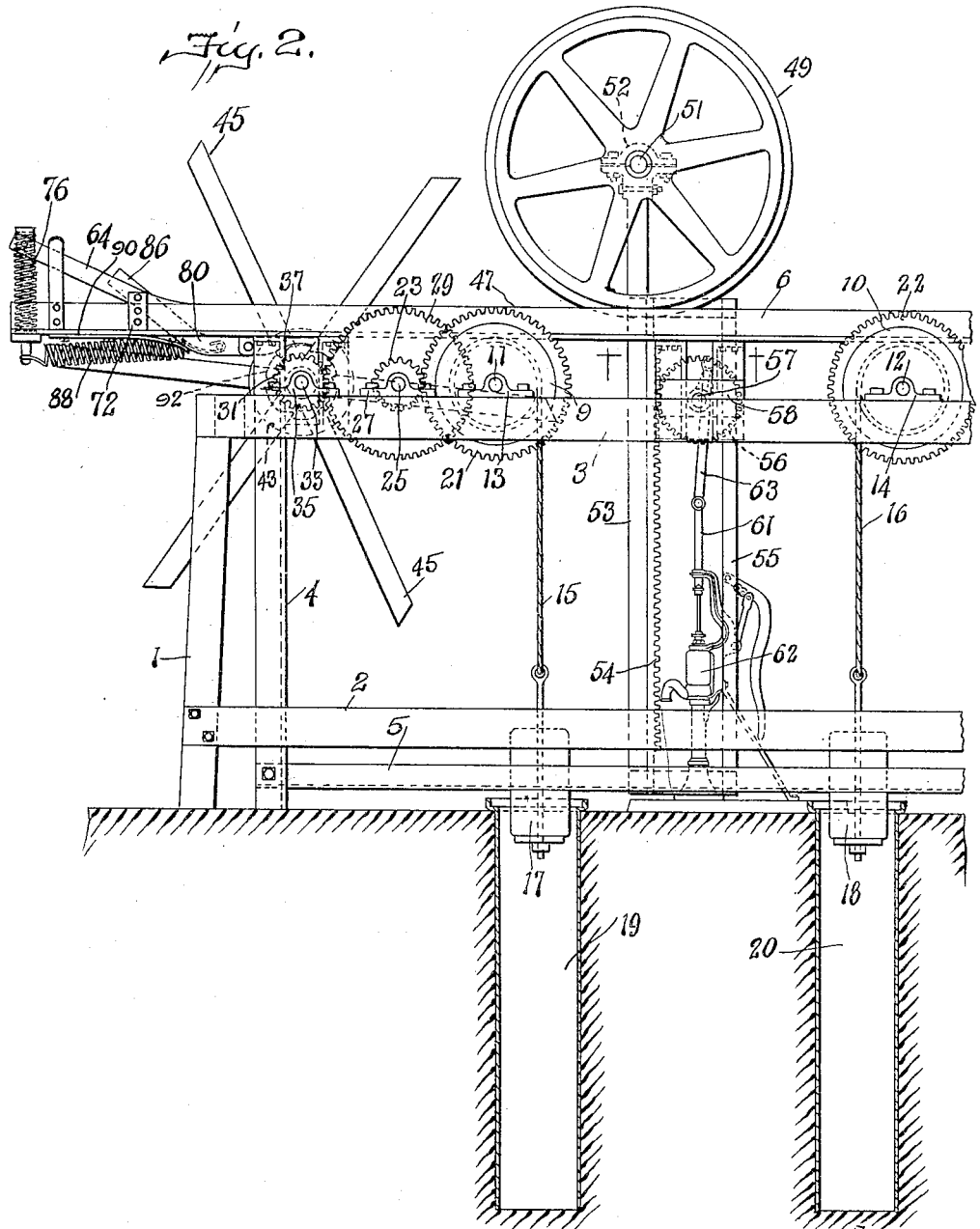

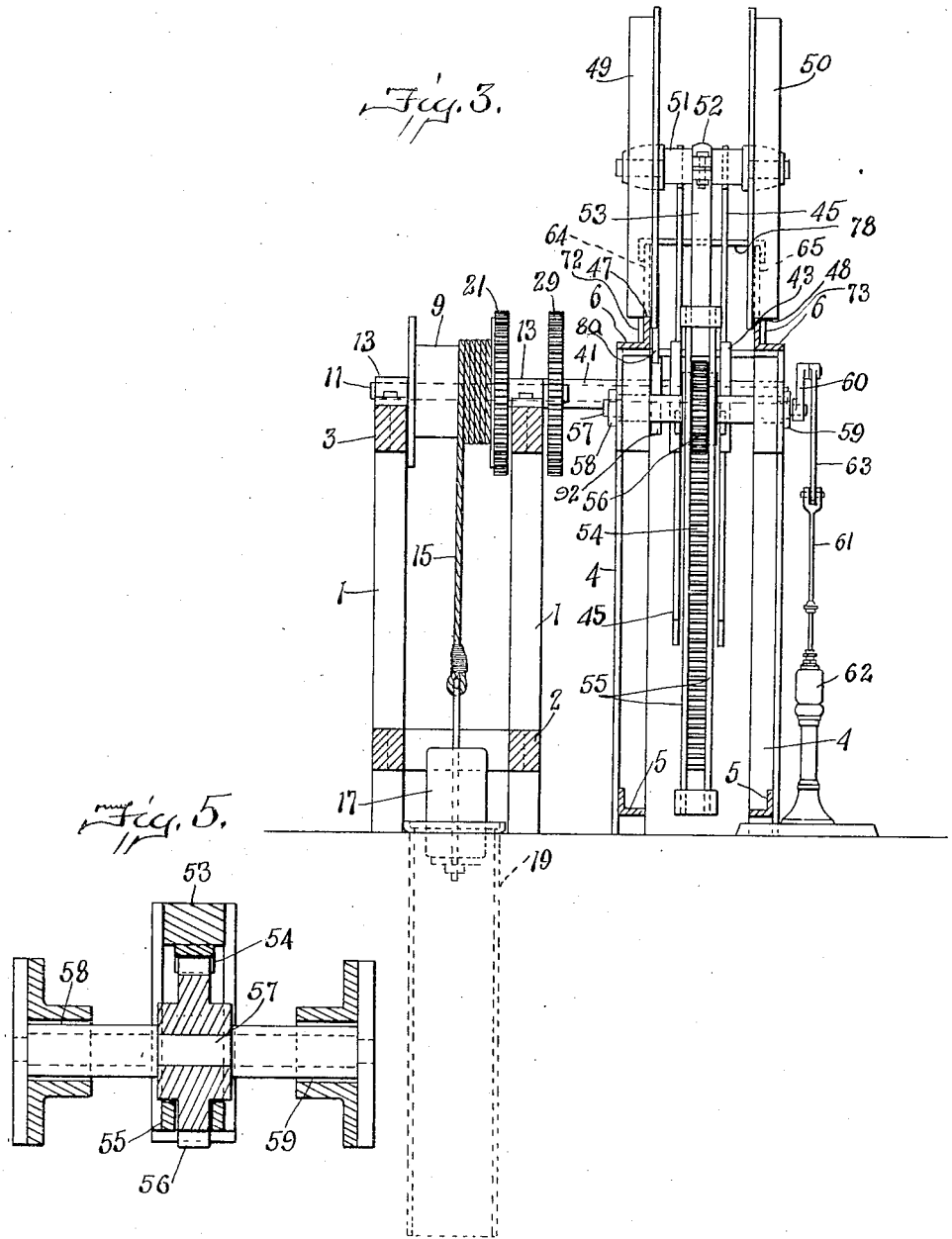

EDWARD A. McLEOD AND MICHAEL F. QUIRK, OF SPRINGFIELD, OHIO, ASSIGNORS OF ONE-SIXTH TO ISAAC EVANS AND ONE-SIXTH TO ANNA J. McLEOD, BOTH OF SPRINGFIELD, OHIO.

WEIGHT-MOTOR.

1,328,384.   Specification of Letters Patent.   Patented Jan. 20, 1920.

Application filed November 21, 1918. Serial No. 263,463.

*To all whom it may concern:*

Be it known that we, EDWARD A. McLEOD and MICHAEL F. QUIRK, citizens of the United States, residing at Springfield, in the county of Clark and State of Ohio, have invented certain new and useful Improvements in Weight-Motors, of which the following is a specification, reference being had therein to the accompanying drawing.

This invention relates to weight motors and has for its object to provide a weight motor adapted to be manually or mechanically wound or energized to operate through a predetermined period of time.

An object of the invention is to provide a weight motor of this character adapted to operate light stationary machinery or other devices used on farms or dairies where it is required to operate such equipment during intervals of short duration.

The weight motor is especially adaptable to the operation of pumps where it is desired to supply water in regular quantities during an interval of time, as a number of hours or half day, the time of operation being determined by the extent the motor is wound.

Thus in gardening or trucking a section of ground may be irrigated during a predetermined period of time, or in pumping water for stock the motor may be wound for the required period of operation, at the end of which the pumping action will automatically stop.

Where a weight motor of this character is used the farmer or other attendant can set the motor to perform the required work and can then employ his time elsewhere as the motor will continue to operate until the energy stored therein is exhausted, the time required to wind the motor being comparatively short to the time the motor will operate.

In the accompanying drawings we have shown the motor as applied to a well known type of pump for pumping water from wells, but obviously the motor is not limited in its use to any particular type of pump or source of water supply.

In a general sense the weight motors are applicable for many of the uses of an electric motor or small engine and are especially serviceable under conditions where it is necessary or desirable to minimize the cost of power equipment or where conditions are not favorable to the operation of electric motors or engines.

The motor is of simple durable construction and when installed requires little attention to maintain the parts in normal working order.

The particular form of the motor as disclosed in the accompanying drawings consists of a pair of drums from which the weights are suspended by means of suitable ropes or chains which are wound about the body of the drums. The drums are controlled by means of inertia wheels which travel back and forth over a horizontal track and act to release the drums, and the weights suspended therefrom, which are located, respectively, adjacent to the opposite ends of the track. By contacting with the arms of a windlass, and, through interlocking ratchet mechanism, the inertia wheels act to release the drums step by step to the tension of the suspended weights. The inertia wheels are connected to the pump by a pitman which operates the pump rod or piston through rack and gear and crank connections.

When the inertia wheels are set in motion after the weights have been wound on the drums the inertia force incidental to the travel of the wheels over the track together with the added force developed by the suspended weights and transmitted to the inertia wheels through the windlass, acts to cause the wheels to travel back and forth from one end to the other of the track without pause until the weights have reached the limit of their downward travel, the force developed by this action being sufficient to operate the pump mechanism continuously during the entire period of operation.

Referring to the drawings, Figure 1 is a plan view of the motor mechanism showing the relative positions of the inertia wheels, the track and windlass and the weight drums;

Fig. 2 is a side elevation of a portion of the mechanism shown in Fig. 1, one end of the track and mechanism connected therewith not being shown;

Fig. 3 is an end elevation of the track and windlass and tripping mechanism for the weight drums;

Fig. 4 is a detail view of the drum tripping mechanism;

Fig. 5 is a detail sectional view of the driving mechanism for the pump, taken on the line 5—5 of Fig. 3.

The construction and operation of the parts at the opposite ends of the mechanism are duplicates. Therefore, only one set of the different units of the mechanism will be described.

In the drawings, 1, 2, 3 is the frame structure upon which the weight drums are located; 4, 5, 6 is the frame structure upon which the track, inertia wheels and windlass are located. The frames may be tied together and braced in any suitable manner, as indicated at 7 and 8.

Upon the upper frame members 3 the weight drums 9 and 10 are supported upon shafts 11 and 12, mounted in bearings 13 and 14 secured to the frame members 3. Suspended from the drums by means of ropes 15 and 16 are weights 17 and 18. To provide for the downward movement of the weights holes 19 and 20 are dug in the ground.

Secured to the inner end of the drums 9 and 10, respectively, are gears 21 and 22 meshing with gears 23 and 24 secured to shafts 25 and 26 mounted in bearings 27 and 28 secured to the inner frame members 3. Secured to the opposite ends of the shafts 25 and 26 are gears 29 and 30 which mesh with gears 31 and 32 secured to shafts 33 and 34, the inner ends of which are supported in bearings 35 and 36 secured to the frame members 3.

The opposite ends and central portions of the shafts 33 and 34 are supported respectively in bearings 37—38 and 39—40 secured to the upper frame members 6. The portions of the shafts extending between the gears 31 and 32 and bearings 37—38 are preferably inclosed by spacing sleeves 41 and 42.

Between the frame members 6—6 and secured to the shafts 33—34 are windlasses 43 and 44 which are provided with radial arms 45 and 46.

The frame members 6 are preferably made of angle irons, the upper edges 47 and 48 of which serve as a track upon which the inertia wheels 49 and 50 may travel. The inertia wheels are provided with an axle portion 51 by means of which the wheels are rigidly secured together.

Operatively secured to the axle 51 between the wheels 49 and 50 by means of a journal 52 is a pitman 53 which has secured to its opposite end a rack 54 supported by guides 55 which are secured to the pitman at their upper and lower ends by cross braces 55ª and mesh with a gear 56 supported on a shaft 57 which is mounted in bearings 58 and 59 secured to the under side of the frame members 6. Secured to the outer end of the shaft 57 is a crank 60 which is connected to the pump piston 61 of the pump 62 by means of a link 63.

At the opposite ends of the track upon which the inertia wheels travel and coöperating therewith are inclined track extensions 64—65 and 66—67 pivoted near their inner ends at 68—69 and 70—71 on vertical posts 72—73 and 74—75 which are secured to the frame members 6 and supported at their outer ends by springs 76—77. The track extensions are preferably joined together at their outer ends by cross pieces 78 and 79 which are preferably made integral thereof.

Also secured to the frame members 6 are latches 80 and 81 having slots 82 and 83, respectively, by means of which the latches are pivoted to the frame members as at 84—85. The latches are provided with upwardly extending arms 86—87 immediately adjacent the angular track extensions 64—66 and normally projecting above the angular plane thereof. The latches 81 are normally drawn rearwardly by springs 88—89 and the extensions 86—87 are held in their normal positions by plate springs 90—91 secured to the under side of the inner frame member 6. The latches 80—81 coöperate with ratchets 92—93, respectively, secured to shafts 33 and 34 in a manner and for a purpose which will presently be described. The frame members 6 are further provided at their opposite ends with vertical posts 94—95 and 96—97 which act to stop the movement of the inertia wheels at their limits of travel in either direction.

To wind the weight motors preliminary to operation thereof the attendant when the winding is done manually rotates the respective windlass of each motor by means of the arms 45, whereby the weight drums through the intermediate gearing are rotated and the weights are wound on the drums to the desired extent, depending upon the length of time the motors are to operate. During the winding operation the ratchets 92—93 are rotated in the direction in which they are free to move relative to the latches 80—81, the latches acting normally to prevent movement of the ratchets and parts controlled thereby, the windlass and drums, in the direction in which they are drawn by the weights 17—18.

When the motors have been wound operation of the mechanism may be started by manually causing the inertia wheels to travel in either direction upon the track 47—48 and a short distance upon the inclined track.

Referring to Fig. 2 and assuming that the motor is to be started by causing the inertia wheels to travel to the left it will be seen that the shaft 51 of the inertia wheels will contact with two opposite arms 45 of the windlass just as the wheels are starting upward on the inclined track 64—65. The travel of the wheels upon the inclined track continues until the wheels contact with stop posts 94—95, the windlass 43 being rotated backwardly by the action of the shaft 51 on the arms 45, thereby causing the weight 17 to be raised slightly by the backward rotation of the drum 9. As the inertia wheels travel upward on the inclined track they contact with the extension 86 of the latch 80 and rotate the latch about its pivot 84 until it clears the tooth of the ratchet 92 with which it is in engagement. When the latch is free of the ratchet it is retracted by the spring 88 and rides on top of the ratchet tooth in a position to engage the following tooth when the inertia wheels start on the return movement.

When the inertia wheels in their upward travel on the inclined track pass the vertical center lines of pivot 68—69 the inclined tracks will be depressed by the weight and momentum of the wheels against the resistance of the springs 76. It will be noted that the shaft 51 of the inertia wheels does not pass out of engagement with the arms 45 of the windlass in its upward travel on the inclined track and therefore that the ratchet and the drums and weights controlled thereby remain inoperative until the inertia wheels start on their downward or return travel on the inclined track.

When the inertia wheels start on their return travel the reaction of the spring 76 and the downwardly inclined track, together with the pull of the weight 17 which is then free to act, serve to start the wheel with the full force of the spring and gravity action which is sufficient to carry the wheels to the opposite ends of the track where a corresponding operation of the mechanism takes place, the pumping action taking place as the inertia wheels travel back and forth from end to end of the tracks.

The connections between the inertia wheels and pump are such that the rack 54 remains in full mesh with the gear 58 at all points of travel of the wheel, the construction being such that two complete strokes of the pump are obtained with each travel of the inertia wheels from one end to the other of the tracks.

The ratio of the gearing between each windlass and its respective drum in the construction illustrated in the drawings is nine to one so that the downward movement of the weights for each pumping action is comparatively slight,—in actual practice somewhat less than ½ inch at each operation. Thus, it will be seen that the motors when wound to their full capacity will continue to operate during a considerable period of time which is determined, of course, by the depth to which the weights are permitted to travel. In ordinary construction provision is made for two to four hours of continuous operation of the motor upon one complete winding of the weight drums.

So far as applicants are aware they are the first to produce a practical weight motor of the general character disclosed in the invention. They do not wish to be limited, therefore, to the specific form of construction disclosed, as obvious modifications thereof may readily be made without departing from the spirit or principles of the invention.

Having thus fully described our invention, what we claim as new and desire to secure by Letters Patent, is:—

1. In a weight motor, the combination, with an inertia wheel, a supporting track therefor, a plurality of suspended weights coacting with said wheel, and a spring reacting element interposed between the inertia wheel and said weights, whereby said wheels are caused to travel back and forth in reciprocal movements on said track.

2. In a weight motor, the combination, with an inertia wheel, a supporting track therefor, a plurality of suspended weights coacting with said wheel, and a reciprocating element interposed between the inertia wheel and said weights and actuated by said wheel, whereby the weights act to cause the wheel to travel in reciprocal movements on said track.

3. In a weight motor, the combination, with an inertia wheel, a supporting track therefor, a plurality of suspended weights coacting with said wheel, and a spring reciprocating element interposed between the inertia wheel and said weights and actuated by said wheel, whereby the weights are released step by step thereby causing said element to actuate the wheel to travel in reciprocal movements on said track.

4. In a weight motor, the combination, with an inertia wheel, a supporting track therefor, a plurality of suspended weights coacting with said wheel, and mechanism at opposite ends of said track interposed between the inertia wheel and said weights, whereby the weights act to cause reciprocal movements of said wheel on said track.

5. In a weight motor, the combination, with an inertia wheel, a supporting track therefor, a plurality of suspended weights coacting with said wheel, and mechanism at opposite ends of said track and actuated by the inertia wheel to impart step by step movement to said weights, whereby said wheel is actuated by said mechanism and caused to move reciprocally on said track.

6. In a weight motor, the combination, with an inertia wheel, a supporting track therefor, a plurality of suspended weights coacting with said wheel, and a plurality of mechanisms interposed between the inertia wheel and said weights and actuated alternately by the wheel to release the weights step by step, whereby said mechanisms are actuated and reciprocal movements are imparted thereby to said wheels.

7. In a weight motor, the combination, with an inertia wheel having a pitman secured thereto, a plurality of gravity members, and means operable by the inertia wheel whereby the gravity members will act alternately to cause reciprocal movements of the inertia wheel and said pitman.

8. In a weight motor, the combination, with an inertia wheel having a pitman secured thereto, a gravity member, and means operable by the inertia wheel to release the gravity member, whereby the gravity member will act step by step to cause reciprocal movements of the inertia wheel and said pitman.

9. In a weight motor, the combination, with an inertia wheel having a pitman secured thereto, a gravity member, and means interposed between the inertia wheel and the gravity member and operable by the inertia wheel to release the gravity member, whereby the gravity member will act to cause reciprocal movements of the inertia wheel and said pitman.

10. In a weight motor, the combination, with an inertia wheel having a pitman secured thereto, a plurality of gravity members, and means operable by the inertia wheel to alternately release the gravity members step by step, whereby said means are actuated by the gravity members and reciprocal movements are imparted thereby to the inertia wheel and said pitman.

11. In a weight motor, the combination, with an inertia wheel, a device operable thereby, a supporting track for the inertia wheel, a stationary rotatable drum having a weight suspended therefrom, a windlass interposed between the inertia wheel and said drum and operable by the inertia wheel to release said drum and said weight, whereby said windlass is actuated by said weight and the inertia wheel is thereby actuated on said track to operate said device.

12. In a weight motor, the combination, with an inertia wheel, a device operable thereby, a supporting track for the inertia wheel, a stationary rotatable drum having a weight suspended therefrom, a normally inoperative windlass coöperating with the inertia wheel and said drum and rendered operative by the inertia wheel, thereby releasing said drum and said weight to operate said windlass and the inertia wheel, whereby said device will be actuated.

13. In a weight motor, the combination, with an inertia wheel, a device operable thereby, a supporting track for the inertia wheel, a stationary rotatable drum having a weight suspended therefrom, a normally inoperative windlass coöperating with the inertia wheel and said drum and rendered operative step by step by the inertia wheel, whereby the drum and the weight suspended therefrom are released to operate the windlass and the inertia wheel, thereby causing said device to be actuated.

14. In a weight motor, the combination, with an inertia wheel, a device operable thereby, a supporting track for the inertia wheel, a stationary rotatable drum having a weight suspended therefrom, a windlass interposed between the inertia wheel and said drum, and means actuated by the inertia wheel whereby said drum and said weight are released, whereby said means will actuate the windlass and cause the inertia wheel to move over said track and operate said device.

15. In a weight motor, the combination, with an inertia wheel, a device operable thereby, a supporting track for the inertia wheel, a stationary rotatable drum having a weight suspended therefrom, an element coöperating with the inertia wheel and said drum and operable by the inertia wheel whereby the drum and the weight suspended therefrom are rendered operative to actuate said element, thereby causing the inertia wheel to actuate said device.

16. In a weight motor, the combination, with an inertia wheel, a device operable thereby, a supporting track for the inertia wheel, a stationary rotatable drum having a weight suspended therefrom, an element coöperating with the inertia wheel and said drum, and means to release said drum and said weight, whereby said element will be actuated to cause the inertia wheel to actuate said device.

17. In a weight motor, the combination, with an inertia wheel, a device operable thereby, a track upon which said wheel moves, a plurality of stationary rotatable drums each having a weight suspended therefrom, and elements coöperating with the inertia wheel and each of said drums, respectively, and operable by the inertia wheel to release said drums and said weights, whereby said elements are actuated alternately to cause reciprocal movement of the inertia wheel upon said track whereby said device is operated.

18. In a weight motor, the combination, with an inertia wheel, a device operable thereby, a track upon which said wheel moves, a plurality of stationary rotatable drums each having a weight suspended therefrom, and elements coöperating with the inertia wheel and each of said drums, respectively, and operable to release said drums and said weights, whereby said elements are actuated alternately to cause said wheel to move back and forth on said track and impart reciprocal operative movement to said device.

19. In a weight motor, the combination, with an inertia wheel having an actuating element secured thereto and having a fixed plane of movement, a plurality of gravity elements, and a controlling element operable by the inertia wheel, whereby the gravity elements are alternately released to actuate the controlling element, and the inertia wheel and said actuating element are actuated to move reciprocally in said plane.

20. In a weight motor, the combination, with an inertia wheel having an actuating element secured thereto and having a fixed plane of movement, a plurality of gravity elements, and a controlling element operable to release the gravity elements alternately, whereby the controlling wheel is actuated to cause the inertia wheel to move reciprocally in said plane.

21. In a weight motor, the combination with an inertia wheel having an actuating element secured thereto and having a fixed plane of movement, a plurality of gravity elements, and a controlling element operable to release the gravity elements alternately, whereby the inertia wheel and said actuating element are actuated to move reciprocally in said plane.

22. In a weight motor, the combination, with an inertia wheel having an actuating element secured thereto and a device operable thereby, a gravity element, and a controlling wheel operable by the inertia wheel to release the gravity wheel, whereby the inertia wheel and said actuating element are actuated to operate said device.

23. In a weight motor, the combination, with an inertia wheel having an actuating element secured thereto, a gravity element, and a controlling element operable to release the gravity element, whereby the inertia wheel and said actuating element will be actuated.

24. In a weight motor, the combination, with an inertia wheel, a pump actuated thereby, a track having inclined spring-supported ends over which said wheel travels, a plurality of drums each having a weight suspended therefrom, and a plurality of windlasses, one for each drum, coöperating with said wheel and said drums and operable to release the drums alternately, whereby said weights and said inclined track ends act to cause the inertia wheel to travel back and forth on said tracks, thereby actuating said device.

25. In a weight motor, the combination, with an inertia wheel, a pump actuated thereby, a track having inclined spring-supported ends over which said wheel travels, a plurality of drums each having a weight suspended therefrom, a plurality of windlasses one for each drum coöperating with the inertia wheel and said drums and operable by the inertia wheel to alternately release said drums, whereby said weights will act to operate the windlasses alternately and said windlasses and said inclined tracks will act to cause the inertia wheel to travel back and forth on said tracks, thereby imparting reciprocal operative movements to said device.

26. In a weight motor, the combination, with an inertia wheel, a pump operable thereby, a track upon which the inertia wheel travels, rack and gear connections between the inertia wheel and the pump, and means to cause the inertia wheel to travel back and forth on said track, whereby said connections are actuated.

27. In a weight motor, the combination, with an inertia wheel, a device operable thereby, a fixed plane in which the inertia wheel travels reciprocally, operable connections between the inertia wheel and said device, and means to actuate the inertia wheel, whereby said connections will be reciprocated to actuate said device.

28. In a weight motor, the combination, with an inertia wheel, a track upon which said wheel travels, a drum having a weight suspended therefrom, means to wind the weight on said drum, and means to release the drum and said weight, whereby the inertia wheel will be actuated by said means to travel over said track.

In testimony whereof we affix our signatures.

EDWARD A. McLEOD.
MICHAEL F. QUIRK.